(12) United States Patent
Farrell

(10) Patent No.: US 11,505,269 B2
(45) Date of Patent: Nov. 22, 2022

(54) AERO-SHAPED CAGELESS BICYCLE WATER BOTTLE AND INTERNAL MOUNT

(71) Applicant: Paul Michael Farrell, Taichung (TW)

(72) Inventor: Paul Michael Farrell, Taichung (TW)

(*) Notice: Subject to any disclaimer, the term of this patent is extended or adjusted under 35 U.S.C. 154(b) by 106 days.

(21) Appl. No.: 16/999,226

(22) Filed: Aug. 21, 2020

(65) Prior Publication Data

US 2021/0053640 A1 Feb. 25, 2021

Related U.S. Application Data

(60) Provisional application No. 62/889,991, filed on Aug. 21, 2019.

(51) Int. Cl.
*B62J 11/04* (2020.01)
*B65D 23/00* (2006.01)

(52) U.S. Cl.
CPC ............. *B62J 11/04* (2020.02); *B65D 23/003* (2013.01)

(58) Field of Classification Search
CPC .................................................... B62J 11/04
USPC ......................................... 224/434; D12/411
See application file for complete search history.

(56) References Cited

U.S. PATENT DOCUMENTS

| | | | | |
|---|---|---|---|---|
| 4,366,922 A | * | 1/1983 | Levine ..................... | B62J 11/04 248/222.13 |
| D271,852 S | * | 12/1983 | Kimura ........................ | D12/411 |
| 4,441,638 A | * | 4/1984 | Shimano ................... | B62J 11/04 224/462 |
| 4,858,869 A | * | 8/1989 | Stang ................... | A47G 23/0225 248/314 |
| 5,238,160 A | * | 8/1993 | Faulds ..................... | B62J 11/04 224/462 |
| 5,251,777 A | * | 10/1993 | McMahon ........... | F16M 13/022 248/291.1 |
| 5,390,836 A | * | 2/1995 | Faulds ..................... | B62J 11/04 224/559 |
| 5,484,128 A | * | 1/1996 | Franco, Sr. .......... | F16M 11/041 248/230.4 |
| 5,624,064 A | * | 4/1997 | McGee, Jr. .............. | B62J 11/04 215/373 |
| 5,947,322 A | * | 9/1999 | Ho ......................... | B65F 1/1607 220/477 |
| 6,808,090 B2 | * | 10/2004 | Pedersen ................ | B65D 25/22 248/205.5 |

(Continued)

FOREIGN PATENT DOCUMENTS

| DE | 9108025 U1 | * | 6/1991 |
|---|---|---|---|
| DE | 202017104340 U1 | * | 9/2017 |

(Continued)

*Primary Examiner* — Justin M Larson
(74) *Attorney, Agent, or Firm* — Schmeiser, Olsen & Watts LLP

(57) ABSTRACT

A bicycle water bottle system is provided. The system includes a mount having a mounting base and a mounting plate extending substantially perpendicular to the mounting base. The mounting base may be configured to connect to a bicycle frame using two fixed pre-formed mounting screw holes. The system also includes a water bottle having a slot formed in one side of the water bottle. The mounting plate is shaped and sized to fit tightly into the slot of the water bottle and the slot is correspondingly shaped and sized to receive the mounting plate to secure the water bottle to the mounting plate.

16 Claims, 10 Drawing Sheets

(56) References Cited

U.S. PATENT DOCUMENTS

| | | | | |
|---|---|---|---|---|
| D739,178 S * | 9/2015 | Wu | ............................ | D12/411 |
| 9,392,862 B1 * | 7/2016 | Hajianpour | ............. | A45F 5/021 |
| 9,914,556 B2 * | 3/2018 | Huang | ................. | B65D 23/001 |
| 2008/0251555 A1 * | 10/2008 | Andrews | .................. | B62J 11/04 |
| | | | | 224/427 |
| 2011/0147424 A1 * | 6/2011 | Brown | ..................... | B62J 11/04 |
| | | | | 224/567 |
| 2021/0053640 A1 * | 2/2021 | Farrell | ................. | B65D 23/003 |
| 2021/0371032 A1 * | 12/2021 | Chang | ....................... | A45F 3/18 |

FOREIGN PATENT DOCUMENTS

| | | | |
|---|---|---|---|
| EP | 0041372 | A2 * | 12/1981 |
| FR | 2496584 | A1 * | 12/1980 |
| FR | 2501144 | A1 * | 3/1981 |

\* cited by examiner

AERO-SHAPED CAGELESS BICYCLE WATER BOTTLE AND INTERNAL MOUNT

CROSS REFERENCE TO RELATED APPLICATION

This application claims priority to U.S. Provisional Patent Application to Paul Michael Farrell entitled "AERO-SHAPED CAGELESS BICYCLE WATER BOTTLE AND INTERNAL MOUNT," Ser. No. 62/889,991, filed Aug. 21, 2019, the disclosures of which are hereby incorporated entirely herein by reference.

BACKGROUND OF THE INVENTION

Technical Field

This invention relates generally to water bottles for bicycles and more particularly to an aero-shaped cageless water bottle for mounting to a bicycle with an internal mount.

State of the Art

A bicycle and rider create significant drag as they pass through air which is acting as a viscous fluid at normal riding speeds. Approximately 70-75% of the energy expended by the rider is used to overcome this drag.

The main contributor to this drag is the rider and his or her position on the bicycle. However, minimizing aerodynamic drag of the bicycle, components and accessories has led to measurable improvement in reducing drag, hence improving performance.

Unfortunately, the vast majority of bicycles still use antiquated round and non-aero shaped water bottles, which are mounted to the bicycle frames using an external fixing cage. Some small improvements to bottle shape and external cage design have been attempted with varied results. Attaching the bottle to the frame using magnets is both costly, has limited aero advantage, and is unreliable over cobbled surfaces. Other devices have similar disadvantages.

Accordingly, there is a need for an improved water bottle and mounting system.

SUMMARY OF THE INVENTION

An embodiment includes a bicycle water bottle system comprising: a mount comprising a mounting base and a mounting plate extending substantially perpendicular to the mounting base, wherein the mounting base is configured to connect to a bicycle frame using two fixed pre-formed mounting holes; and a water bottle comprising a slot formed in one side of the water bottle, wherein the mounting plate is shaped and sized to fit tightly into the slot of the water bottle, wherein the slot is correspondingly shaped and sized to receive the mounting plate and thereby secure the water bottle to the mounting plate.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
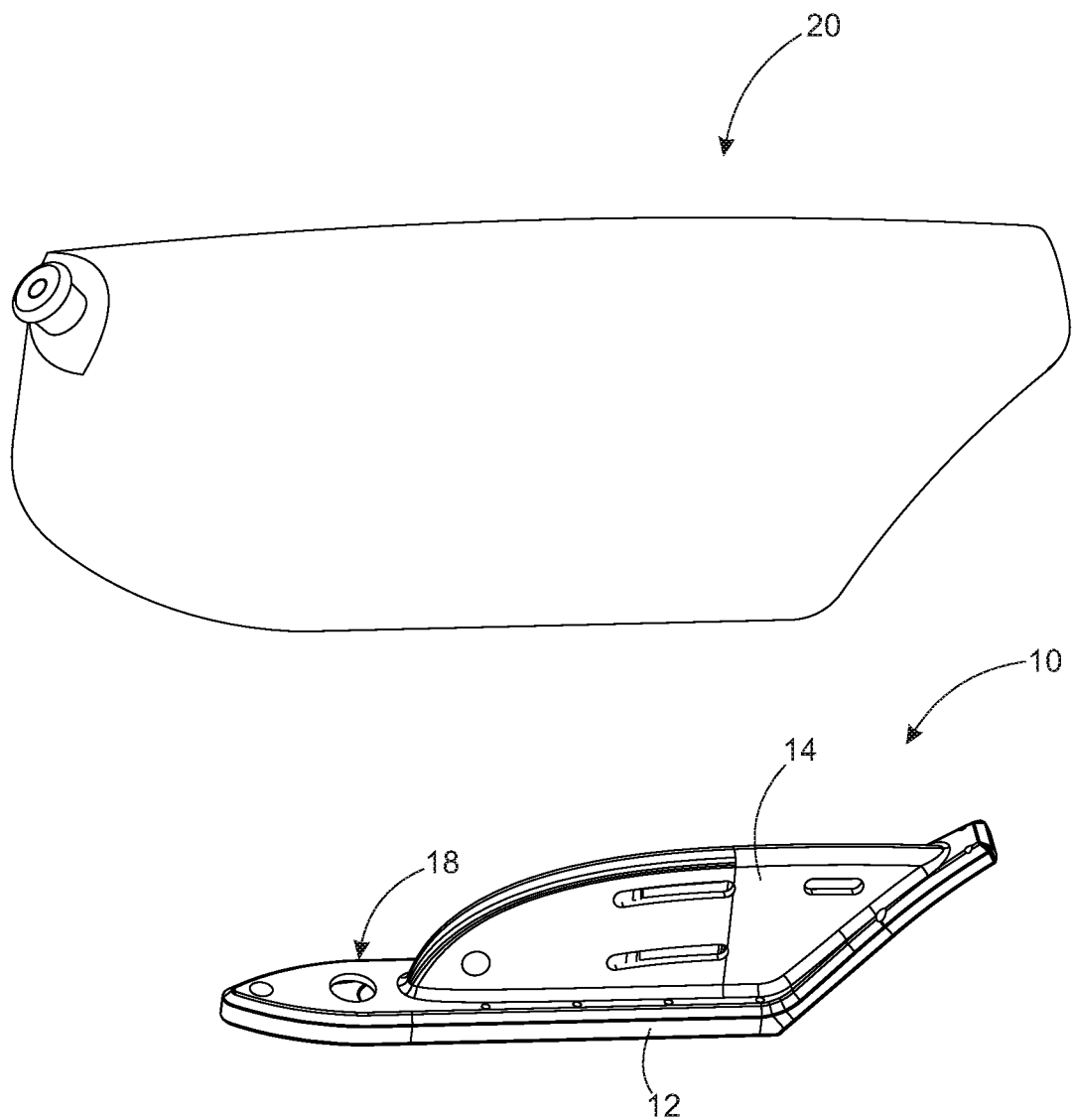
FIG. 1 is a perspective view of an aero-shaped cageless bicycle water bottle and internal mount, in accordance with an embodiment.
Figure 2:
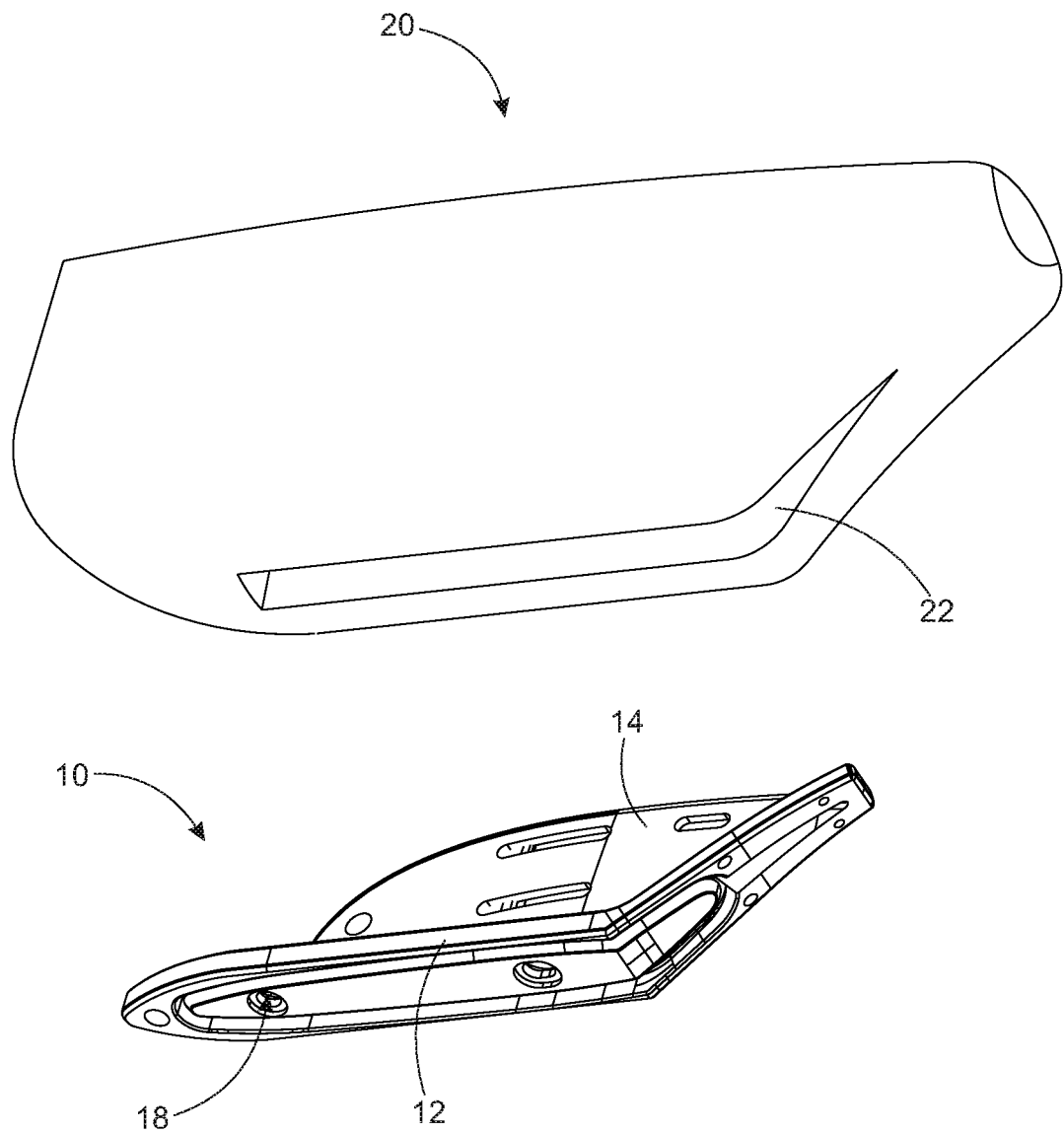
FIG. 2 is a perspective view of an aero-shaped cageless bicycle water bottle and internal mount, in accordance with an embodiment.
Figure 3:
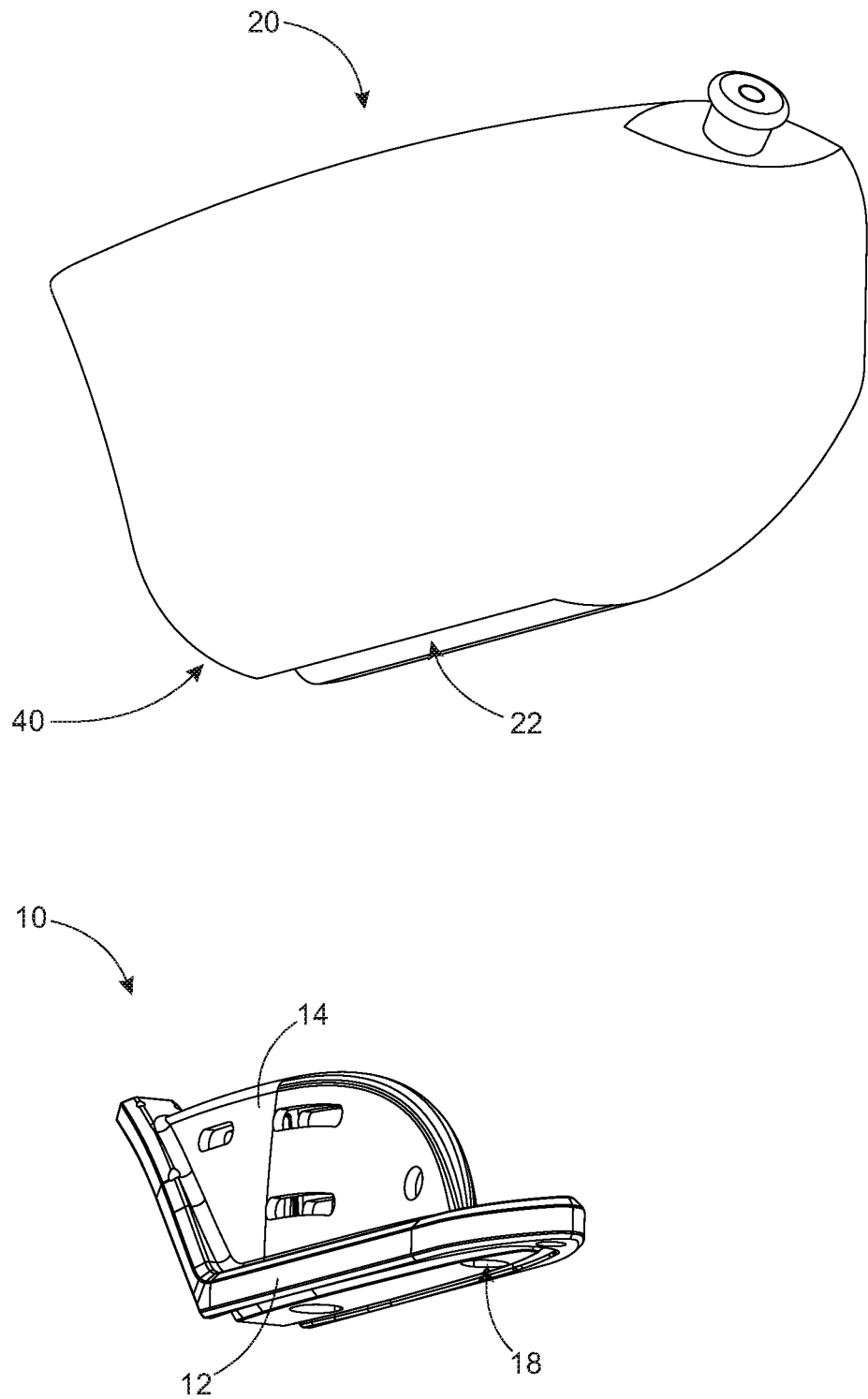
FIG. 3 is another perspective view of an aero-shaped cageless bicycle water bottle and internal mount, in accordance with an embodiment.
Figure 4:
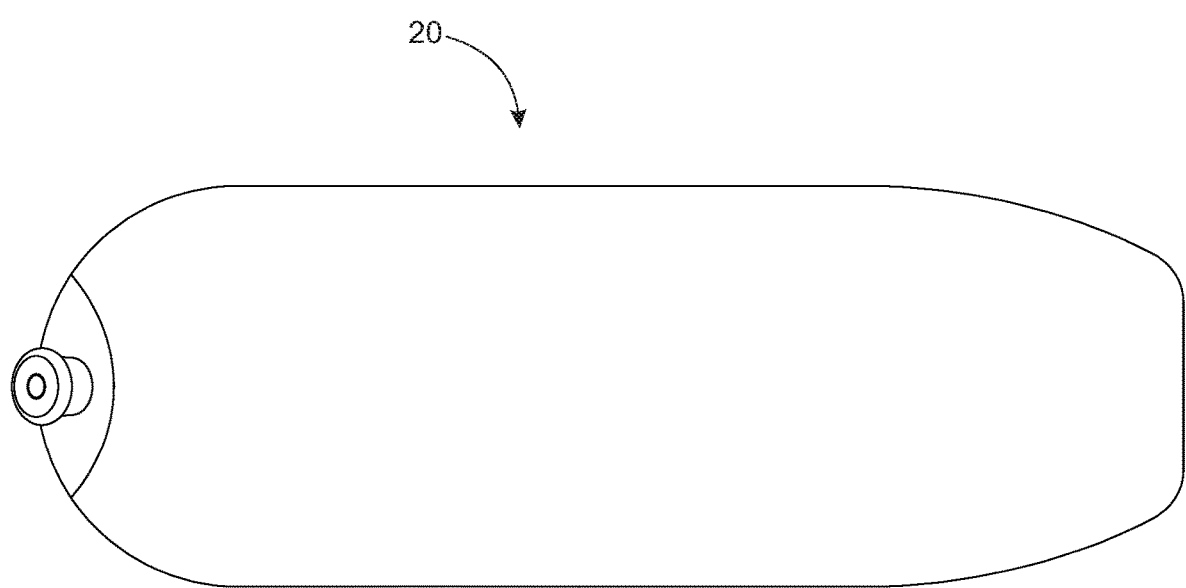
FIG. 4 is a top view of an aero-shaped cageless bicycle water bottle and internal mount, in accordance with an embodiment.
Figure 5:
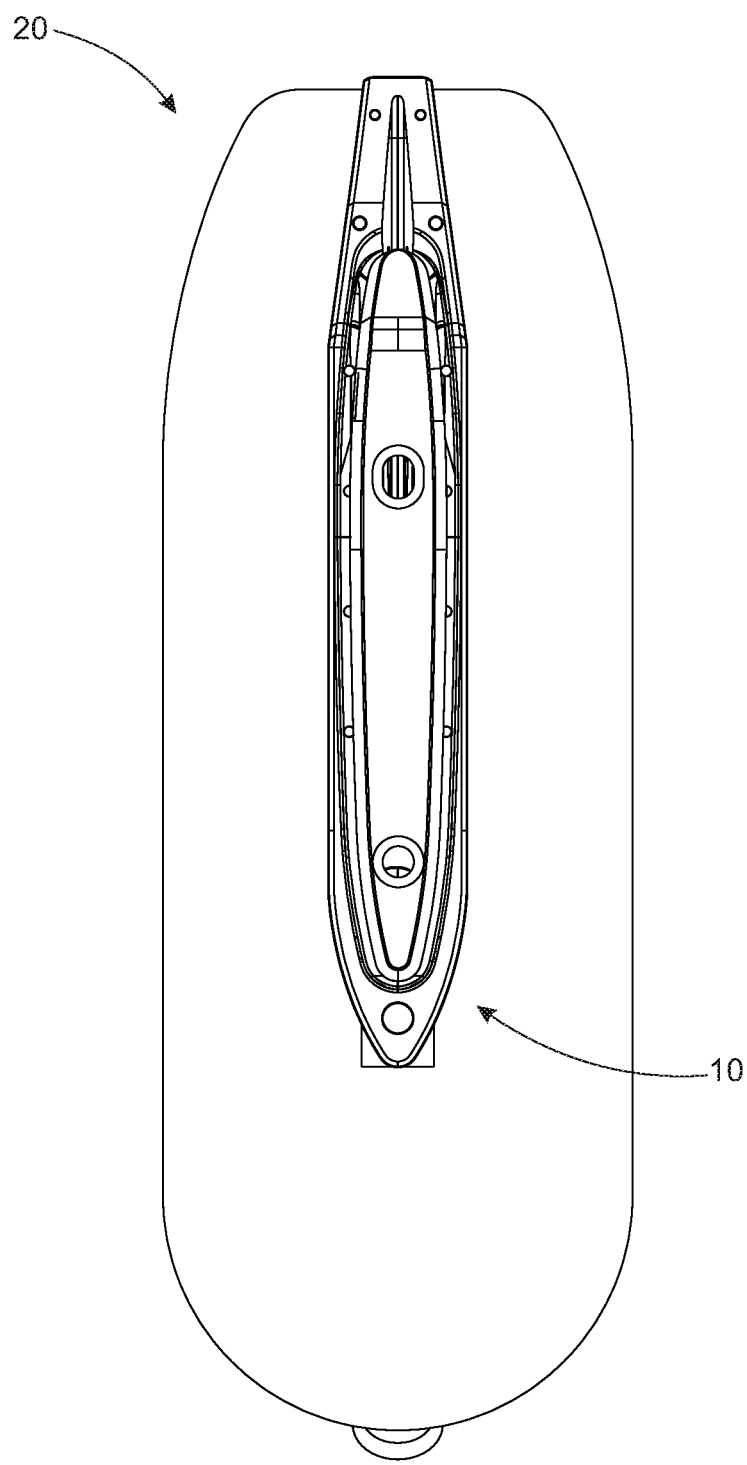
FIG. 5 is a bottom view of an aero-shaped cageless bicycle water bottle and internal mount, in accordance with an embodiment.
Figure 6:
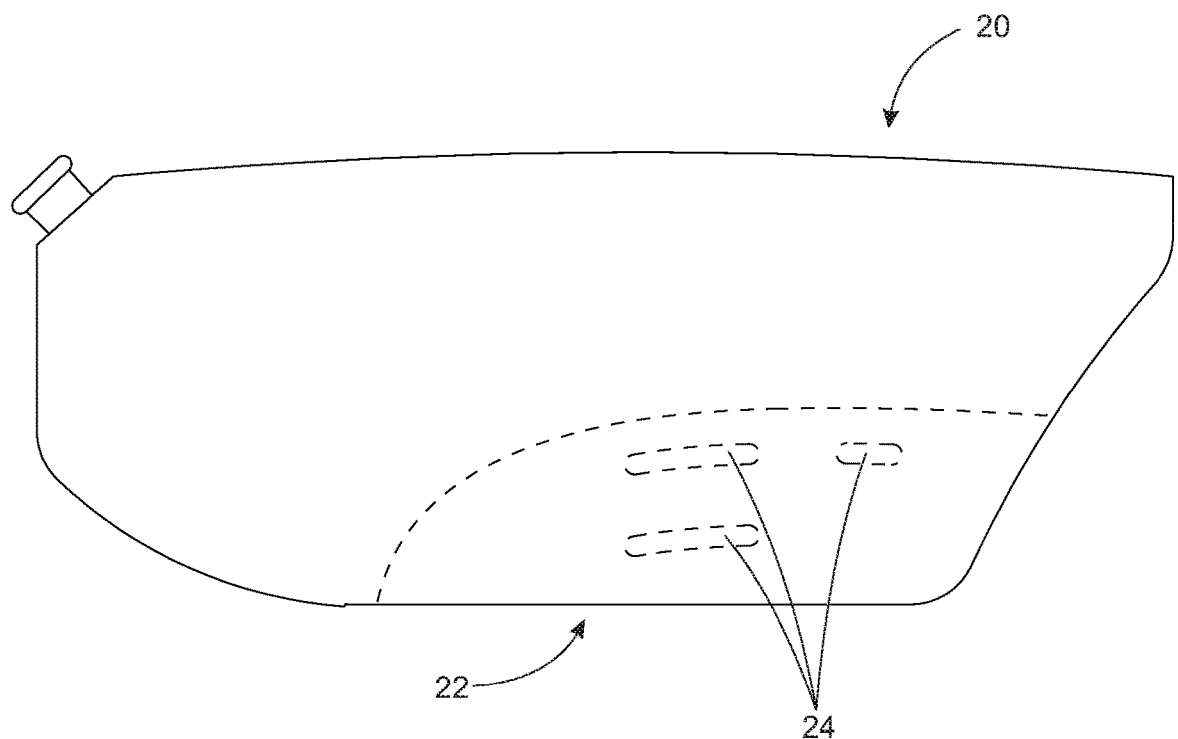
FIG. 6 is a right-side view of an aero-shaped cageless bicycle water bottle and internal mount, in accordance with an embodiment.
Figure 6:
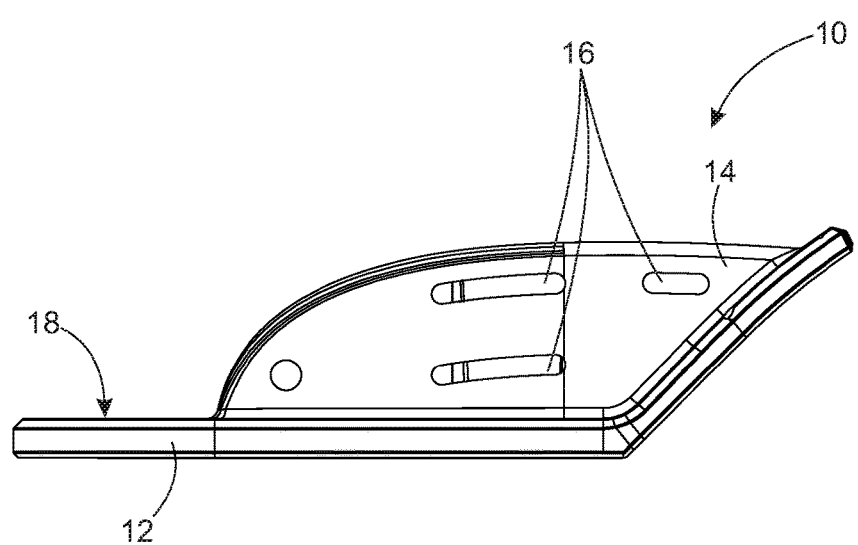
Figure 7:
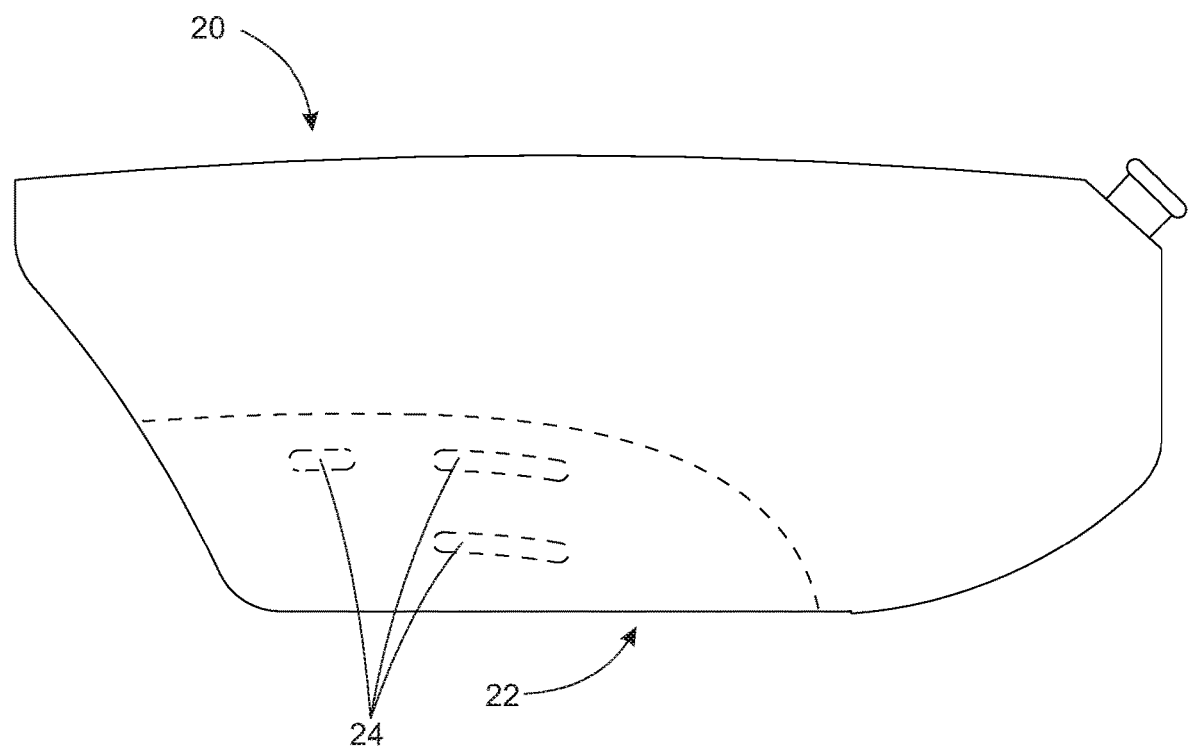
FIG. 7 is a left-side view of an aero-shaped cageless bicycle water bottle and internal mount, in accordance with an embodiment.
Figure 7:
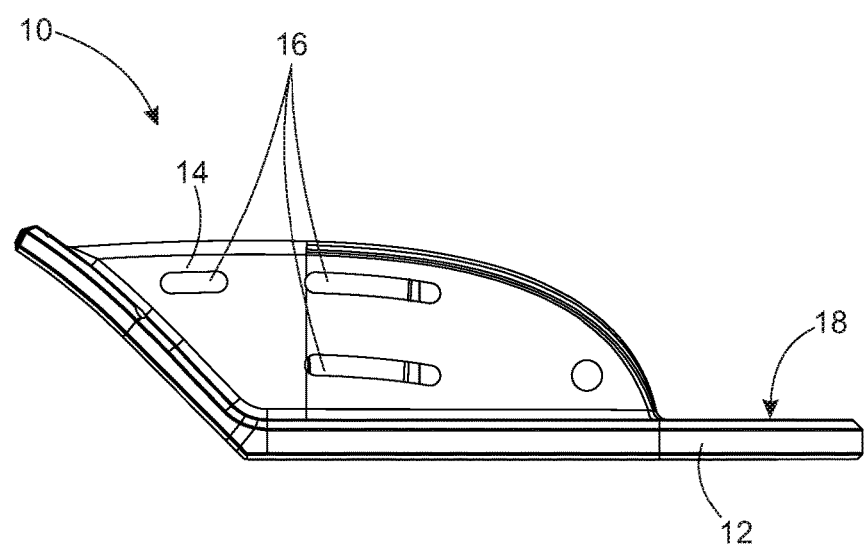
Figure 8:
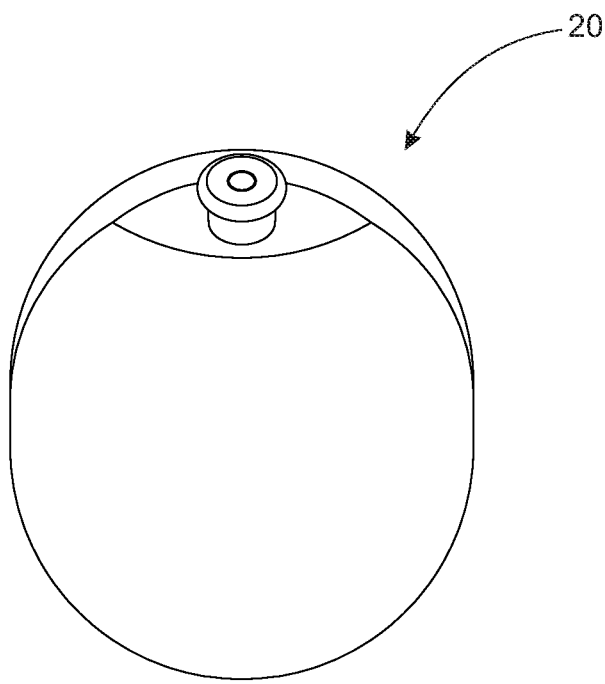
FIG. 8 is a front view of an aero-shaped cageless bicycle water bottle and internal mount, in accordance with an embodiment.
Figure 8:
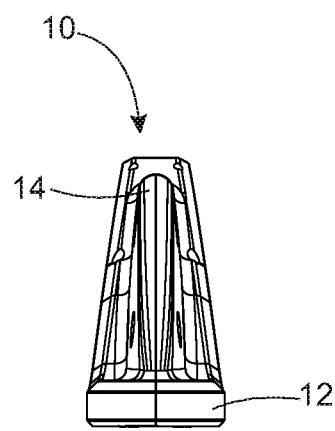
Figure 9:
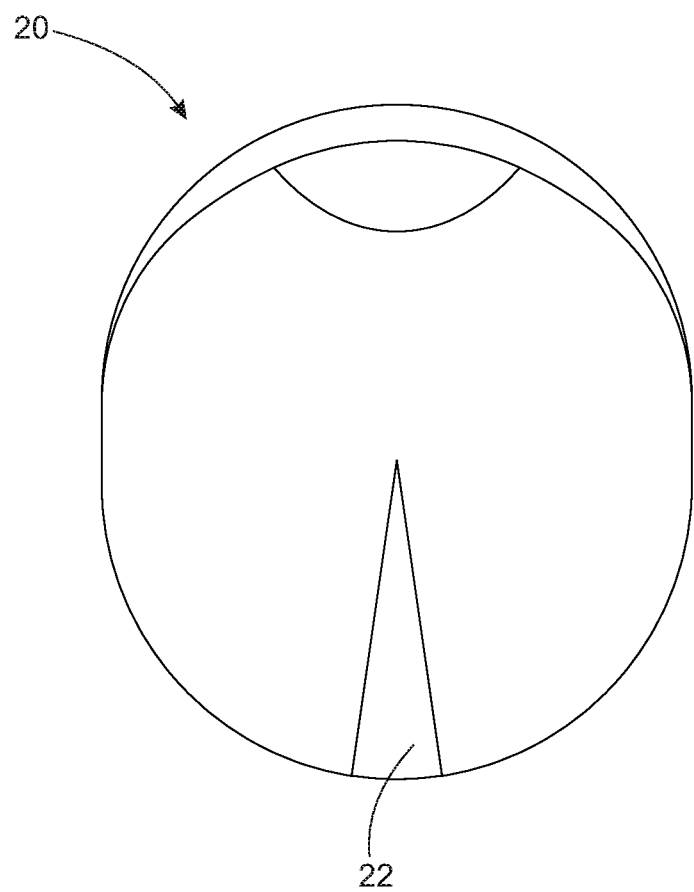
FIG. 9 is a rear view of an aero-shaped cageless bicycle water bottle and internal mount, in accordance with an embodiment.
Figure 9:
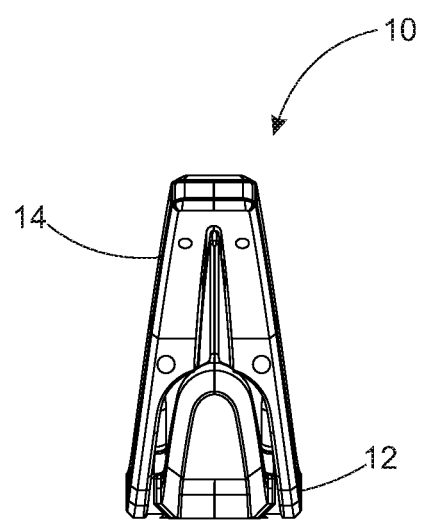

As discussed above, embodiments of the present invention relate to an aero-shaped cageless bicycle water bottle and internal mount. This invention removes the external cage completely and replaces it with a fully internal mounting device, allowing full freedom to redesign the shape and hence the aero efficiency of the water bottle. Embodiments include a new two-part solution or water bottle system that is fully compatible with all existing frame bottle cage mounting fixtures that are industry standard.

Referring to the drawings, FIGS. 1-9 depict various views of an aero-shaped cageless bicycle water bottle 20 and internal mount 10.

The Internal Fixing Mount

The internal mount 10 is a small device that is attachable to a bicycle frame in the conventional manner using two fixing screws and connect directly into standard threaded inserts on the down tube and seat tube of the bicycle frame. The standard industry distance between centers of these inserts is 65 mm. In some embodiments, the internal mount may have a pair of screw holes 18 for receiving a pair of screws therethrough for coupling the internal mount to the bicycle frame, wherein the screw holes 18 correspond to and are aligned with the threaded inserts of the bicycle frame. Although an internal mount 10, of the present invention, is described as being attachable by two fixing screws into standard threaded inserts on the down tube and seat tube of a bicycle frame, this is not intended to be limiting. It is understood that any of a variety of mounting hardware and/or means of coupling an internal mount to a bicycle frame may be utilized, such as bolts, straps, clamping devices, or the like, known now or in the future, consistent with mounting an internal mount to a bicycle frame with the utility described herein.

The mount 10 can be made of any suitable material including light alloy, injection molded plastics or other molded composites, and/or a combination of such materials. Being small in size, it is lighter than a conventional external water bottle cage and simpler/cheaper to mass produce.

In some embodiments, the internal mount 10 comprises two main structures: a mounting base 12 which, in some embodiments, connects the mount to the bicycle frame using two fixed pre-formed mounting holes; and a mounting plate 14, which forms part of the mounting base 12 structurally and is disposed at approximately a 90 degree angle to the mounting base 12. This plate 14 is shaped and sized to fit tightly into a correspondingly shaped and sized slot 22 formed into one side of the aero water bottle 20. For example, the plate 14 may frictionally engage slot 22 to form a friction fit between the plate 14 and the slot 22. Another example is that the plate 14 may contact one or more surfaces of the slot 20. In at least these ways, the plate is fit tightly into the slot 20.

In embodiments, the mounting plate 14 may have either one or a series of shaped openings 16 that correspond to similarly shaped protuberances molded inside the slot 22 created into the water bottle 20. The shaped hole(s) 16 and protuberances provide the necessary physical contact mechanism which 'locks' or otherwise removably couples the bottle to the base when fully located.

The protuberances and similarly shaped indentations may be reversed so that the mounting plate is completely solid with suitably shaped protuberances on both or one side of the plate which correspond with similarly shaped indentation(s) molded into the slot in the water bottle.

Figure 10:
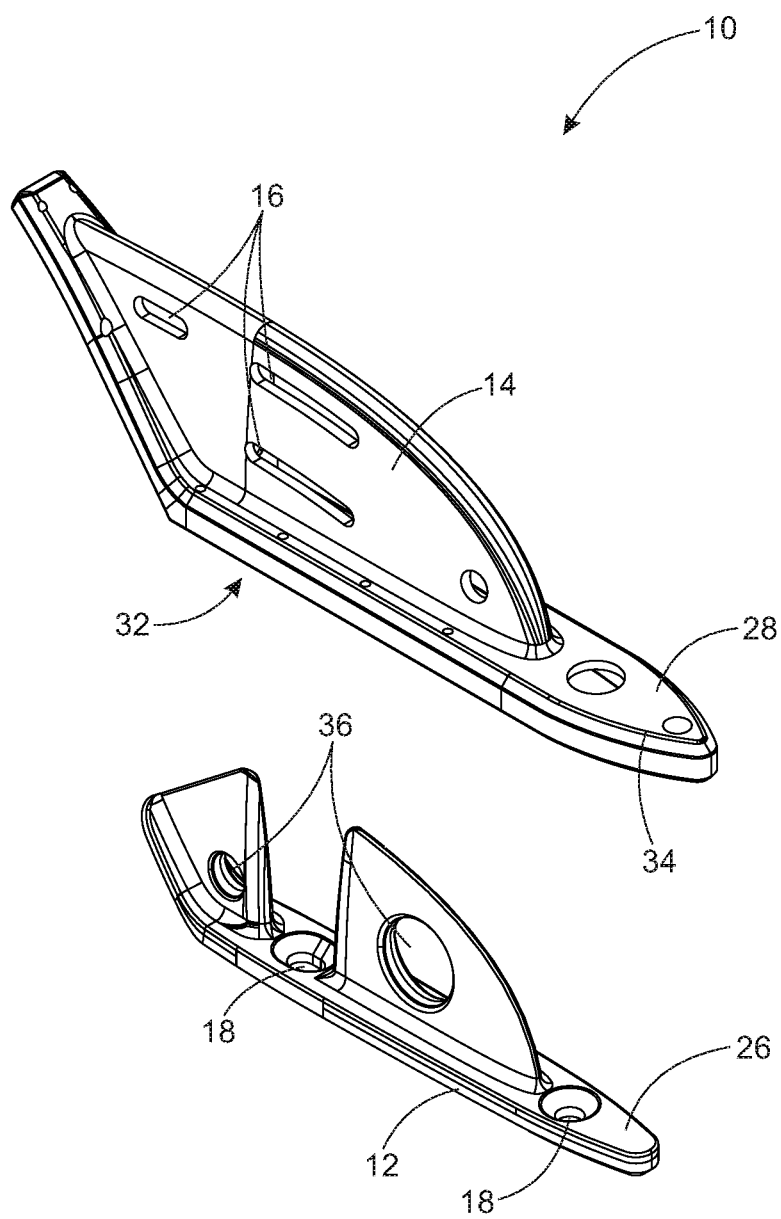
FIG. 10 is an exploded view of an internal mount in accordance with an embodiment.

In some embodiments, as shown in FIG. 10, the internal mount 10 is an assembly of a first piece 26 and a second piece 28. In such embodiments, the first piece 26 may comprise a mounting base 12 having a pair of screw holes 18 therethrough configured for receiving a pair of mounting screws therethrough for securing the first piece 26 to a bicycle frame. The first piece 26 may further comprise at least one mounting fin 30 extending perpendicularly from the mounting base 12 and configured to be inserted into a corresponding receiving slot 32 in the second piece 28. As shown in FIG. 10, the second piece 28 may be coupled to the first piece 26 by sliding the second piece over the first piece 26. In some embodiments, the second piece may comprise a mounting base cover 34 that covers the mounting base 12 of the first piece 26, and a mounting plate 14 extending perpendicularly from the mounting base cover 34. In embodiments, second piece 28 is configured to snap into place over the first piece 26, such as by use of one or more tabs and corresponding detents. For example, first piece 26 may comprise at least one aperture 36 therethrough corresponding to at least one second piece protuberance 38 within the second piece receiving slot 32. However, it is understood that second piece 28 may be configured to be removably coupled to a bicycle frame by any of a variety of conventional means and second piece 28 may be configured to be removably coupled to first piece 26 by any of a variety of conventional means, consistent with the utility of an internal mount 10 as described herein.

The Water Bottle

The water bottle 20 has an external mounting slot 22 that is shaped to be a fit for the mounting plate 14 of the mount 10 described above. The rear end 40 of the slot 22 (base of the bottle end) is funnel-shaped to ensure smooth and "eyes free" engagement of the water bottle 20 to the mount 10 whilst riding.

The bottle slot 22 may shaped and created by a conventional water bottle molding process. Numerous such processes exist, any of which can be used to create this type of bottle and slot design. No special materials other than those already commonplace in the water bottle industry are required.

The external cageless bottle lends itself to optimization of the aerodynamic shape thus reducing drag. This invention does not propose or suggest any one bottle shape, but rather is contemplated that any type of bottle shape, such as, but not limited to an aerodynamic shape may be utilized, so long as the water bottle 20 includes the mounting slot 22 that will be common to all embodiments of a water bottle 20 of the present invention.

This mount 10 and water bottle 20 have numerous advantages. These advantages include, without limitation:

a. Fits all existing industry standard bicycle frames;
b. Can be fitted to small and extra small frame size seat tubes that cannot use external cage type water bottles due to their top-only loading requirement;
c. Lightweight compared to existing designs;
d. Conventional manufacturing technology—Parts can be manufactured globally close to end-user source;
e. Provable and significant aerodynamic improvement in reducing drag;
f. Unlimited bottle shapes can be created all utilizing the same internal base mount device;
g. Bottle graphics/logo will not degrade over time as no contact with any external cage—Ensuring significantly longer product life and visual appeal; and h. Cost compatible with existing water bottle and cage designs.

While it has been shown and disclosed that embodiments of the internal mount and the water bottle are used with bicycles other embodiments may be utilized in other ways. For example, the internal mount may be coupled to other structures like a backpack frame, work equipment and so forth. Accordingly, the internal mount may be coupled to a structure and operate with a water bottle in a similar manner as described above.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A bicycle water bottle system comprising:
an internal mount comprising a mounting base and a mounting plate extending substantially perpendicular to the mounting base, wherein the mounting base is configured to be coupled to a bicycle frame; and
a water bottle comprising a slot formed in one side of the water bottle, wherein the mounting plate is shaped and sized to fit tightly into the slot of the water bottle, wherein the slot is correspondingly shaped and sized to receive the mounting plate and thereby removably couple the water bottle to the mounting plate, and wherein the mounting plate comprises at least one opening therethrough and an internal surface of the slot comprises at least one protuberance extending therefrom, wherein each of the at least one protuberance corresponds to each of the at least on opening, wherein the water bottle is removably secured to the mounting plate by engagement of the at least one protuberance with the corresponding at least one opening when the water bottle is removably coupled to the mounting plate.

2. The system of claim 1, wherein the mounting base comprises a pair of screw holes configured to receive a pair of corresponding screws therethrough for coupling the mounting base to the bicycle frame.

3. The system of claim 1, wherein an opening to the slot is funnel-shaped for guiding and receiving the mounting base into the slot as the water bottle is removably coupled to the mounting base.

4. A bicycle water bottle system comprising:
an internal mount comprising a mounting base and a mounting plate extending substantially perpendicular to the mounting base, wherein the mounting base is configured to be coupled to a bicycle frame; and
a water bottle comprising a slot formed in one side of the water bottle, wherein the mounting plate is shaped and sized to fit tightly into the slot of the water bottle, wherein the slot is correspondingly shaped and sized to receive the mounting plate and thereby removably couple the water bottle to the mounting plate, and wherein the mounting plate comprises at least one protuberance extending therefrom and an internal surface of the slot comprises at least one opening therethrough, wherein each of the at least one protuberance corresponds to each of the at least on opening, wherein the water bottle is removably secured to the mounting plate by engagement of the at least one protuberance with the corresponding at least one opening when the water bottle is removably coupled to the mounting plate.

5. A bicycle water bottle system comprising:
an internal mount comprising:
a first piece, comprising:
a mounting base; and
at least one mounting fin extending substantially perpendicular to the mounting base, wherein the mounting base is configured to be coupled to a bicycle frame; and
a second piece, comprising:
a mounting base cover; and
a mounting plate extending substantially perpendicular to the mounting base cover, the mounting plate comprising a mounting plate slot formed therein, wherein the at least one mounting fin is shaped and sized to fit tightly into the mounting plate slot and thereby removably couple the second piece to the first piece; and
a water bottle comprising a slot formed in one side of the water bottle, wherein the mounting plate is shaped and sized to fit tightly into the slot of the water bottle, wherein the slot is correspondingly shaped and sized to receive the mounting plate and thereby removably couple the water bottle to the mounting plate.

6. The system of claim 5, wherein the mounting base comprises a pair of screw holes configured to receive a pair of corresponding screws therethrough for coupling the mounting base to the bicycle frame.

7. The system of claim 5, wherein the first piece and the second piece are each configured to be removably coupled together by at least one tab and at least one corresponding detent.

8. The system of claim 5, wherein the mounting plate comprises at least one opening therethrough and an internal surface of the slot comprises at least one protuberance extending therefrom, wherein each of the at least one protuberance corresponds to each of the at least one opening, wherein the water bottle is removably secured to the mounting plate by engagement of the at least one protuberance with the corresponding at least one opening when the water bottle is removably coupled to the mounting plate.

9. The system of claim 5, wherein the mounting plate comprises at least one protuberance extending therefrom and an internal surface of the slot comprises at least one detent therein, wherein each of the at least one protuberance corresponds to each of the at least one detent, wherein the water bottle is removably secured to the mounting plate by engagement of the at least one protuberance with the corresponding at least one detent when the water bottle is removably coupled to the mounting plate.

10. The system of claim 5, wherein an opening to the slot is funnel-shaped for guiding and receiving the mounting base into the slot as the water bottle is removably coupled to the mounting base.

11. A water bottle system comprising:
an internal mount comprising:
a first piece, comprising:
a mounting base; and
at least one mounting fin extending substantially perpendicular to the mounting base, wherein the mounting base is configured to be coupled to a structure; and
a second piece, comprising:
a mounting base cover; and
a mounting plate extending substantially perpendicular to the mounting base cover, the mounting plate comprising a mounting plate slot formed therein, wherein the at least one mounting fin is shaped and sized to fit tightly into the mounting plate slot and thereby removably couple the second piece to the first piece; and
a water bottle comprising a slot formed in one side of the water bottle, wherein the mounting plate is shaped and sized to fit tightly into the slot of the water bottle, wherein the slot is correspondingly shaped and sized to receive the mounting plate and thereby removably couple the water bottle to the mounting plate.

12. The system of claim 11, wherein the mounting base comprises a pair of screw holes configured to receive a pair of corresponding screws therethrough for coupling the mounting base to the structure.

13. The system of claim 11, wherein the first piece and the second piece are each configured to be removably coupled together by at least one tab and at least one corresponding detent.

14. The system of claim 11, wherein the mounting plate comprises at least one opening therethrough and an internal surface of the slot comprises at least one protuberance extending therefrom, wherein each of the at least one protuberance corresponds to each of the at least one opening, wherein the water bottle is removably secured to the mounting plate by engagement of the at least one protuberance with the corresponding at least one opening when the water bottle is removably coupled to the mounting plate.

15. The system of claim 11, wherein the mounting plate comprises at least one protuberance extending therefrom and an internal surface of the slot comprises at least one detent therein, wherein each of the at least one protuberance corresponds to each of the at least one detent, wherein the water bottle is removably secured to the mounting plate by engagement of the at least one protuberance with the corresponding at least one detent when the water bottle is removably coupled to the mounting plate.

16. The system of claim 11, wherein an opening to the slot is funnel-shaped for guiding and receiving the mounting base into the slot as the water bottle is removably coupled to the mounting base.

* * * * *